(12) United States Patent
Kim

(10) Patent No.: US 7,911,524 B2
(45) Date of Patent: Mar. 22, 2011

(54) PHOTOGRAPHING APPARATUS AND STILL IMAGE PHOTOGRAPHING METHOD THEREOF

(75) Inventor: Sung-jin Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 11/808,184

(22) Filed: Jun. 7, 2007

(65) Prior Publication Data

US 2008/0136929 A1 Jun. 12, 2008

(30) Foreign Application Priority Data

Dec. 11, 2006 (KR) .......................... 10-2006-0125409

(51) Int. Cl.
*H04N 5/335* (2006.01)
(52) U.S. Cl. .................. 348/323; 348/321; 348/311
(58) Field of Classification Search .......... 348/294–324; 250/208.1; 257/291–294
See application file for complete search history.

(56) References Cited

U.S. PATENT DOCUMENTS

| | | | | |
|---|---|---|---|---|
| 4,455,575 A * | 6/1984 | Murakoshi | ................... | 348/322 |
| 4,597,013 A * | 6/1986 | Matsumoto | ................... | 348/317 |
| 5,289,022 A * | 2/1994 | Iizuka et al. | ................... | 257/232 |
| 6,236,434 B1 * | 5/2001 | Yamada | ....................... | 348/315 |
| 6,339,213 B2 * | 1/2002 | Harada | ...................... | 250/208.1 |
| 2003/0146996 A1 * | 8/2003 | Ide | .................................. | 348/323 |
| 2004/0201760 A1 * | 10/2004 | Ota et al. | ...................... | 348/272 |

* cited by examiner

*Primary Examiner* — Sinh Tran
*Assistant Examiner* — Mark Monk
(74) *Attorney, Agent, or Firm* — Roylance, Abrams, Berdo & Goodman, LLP

(57) ABSTRACT

A photographing apparatus and a still image photographing method thereof are provided where the photographing apparatus includes a lens for forming an optical image of a subject in an image pickup unit; an image pickup unit for photoelectrically converting the optical image formed through the lens to an electrical image signal, a signal processing unit for processing the photo-electrically converted image signal to a luminance signal and a color signal, a compression unit for compressing the processed image signal, and a storage unit for storing the compressed image signal, the image pickup unit comprising two vertical transmission registers for accumulating an image of an even filed and an image of an odd field in a memo. Accordingly, a clear still image can be obtained without an iris diaphragm.

11 Claims, 4 Drawing Sheets

PHOTOGRAPHING APPARATUS AND STILL IMAGE PHOTOGRAPHING METHOD THEREOF

CROSS-REFERENCE TO RELATED APPLICATIONS

This application claims benefit under 35 U.S.C. §119(a) of Korean Patent Application No. 2006-125409, filed on Dec. 11, 2006, in the Korean Intellectual Property Office, the entire content of which is incorporated herein by reference.

BACKGROUND OF THE INVENTION

1. Field of the Invention

The present invention relates to a photographing apparatus and a still image photographing method thereof. More particularly, the present invention relates to a photographing apparatus and a still image photographing method which photographs a still image using an interlace charge-coupled device (CCD).

2. Description of the Related Art

An interlace CCD is mainly used in photographing a motion image to increase the quality of the motion image. In order to photograph a still image using the interlace CCD, a mecha capture method can be used. In the mecha capture method, during the process of reading CCD images of two fields, a signal is accumulated in the CCD only for one field and an iris diaphragm is rapidly closed in the other field to prevent accumulation of a signal in the CCD.

FIGS. 1A and 1B are views for explaining a conventional still image photographing method.

FIG. 1A shows a CCD including a plurality of Mg, G, Cy, and Ye photo sensors, vertical transmission registers 10_1, 10_2, ..., 10_n−1, and 10_n, and a horizontal transmission register 20 and FIG. 1B shows signals generated when the still image is photographed.

As shown in FIG. 1B, a still image capture signal becomes a high level, after one field, an iris diaphragm is closed. After the iris diaphragm is closed, an XSG1 signal and an XSG2 signal are generated. The XSG1 signal and the XSG2 signal are signals for moving charges accumulated in the photo sensor to the vertical transmission registers 10_1, 10_2, ..., 10_n−1, and 10_n and are not output simultaneously but are output once in different fields.

If the XSG1 signal is generated, the charges accumulated in horizontal odd lines Mg, G, ..., Mg, and G, G, Mg, ..., G, and Mg, ..., and Mg, G, ..., Mg, and G are moved to the first vertical transmission registers 10_1, 10_2, ..., 10_n−1, and 10_n. Further, an electrical image signal of an odd field is output by moving the charges moved to the first vertical transmission registers 10_1, 10_2, ..., 10_n−1, and 10_n are to the horizontal transmission register.

Further, after one field, as the XSG2 signal is generated, the charges accumulated in horizontal even lines Cy, Ye, ..., Cy, and Ye, Cy, Ye, ..., Cy, and Ye, ..., and Cy, Ye, ..., Cy, and Ye are moved to the first vertical transmission registers 10_1, 10_2, ..., 10_n−1, and 10_n. Further, an electrical image signal of an even field is output by moving the charges moved to the first vertical transmission registers 10_1, 10_2, ..., 10_n−1, and 10_n to the horizontal transmission register 20.

The above-mentioned mecha capture method limits the accumulation time of an image accumulated in the interlace CCD to one field, using an iris diaphragm. In the case in which a still image is photographed using the interlace CCD, an iris diaphragm is inevitably necessary. Further, since the time, at which the iris diaphragm is closed, is changed according to peripheral circuits, the iris diaphragm cannot be minutely regulated, thereby lowering the quality of a still image.

SUMMARY OF THE INVENTION

Accordingly, it is an object of the present invention to provide a photographing apparatus and method which, by providing an vertical transmission register in addition to a conventional vertical transmission register, store an image of an odd field and an image of an even field in the vertical transmission registers to generate an image signal, without using an iris diaphragm, in order to improve the quality of a still image.

Exemplary embodiments of the present invention provide a photographing apparatus comprising a lens for forming an optical image of a subject in an image pickup unit; an image pickup unit for photoelectrically converting the optical image formed through the lens to an electrical image signal, a signal processing unit for processing the photoelectrically converted image signal to a luminance signal and a color signal, a compression unit for compressing the processed image signal; and a storage unit for storing the compressed image signal, the image pickup unit comprising two vertical transmission registers for accumulating an even field image and an odd field image in a memo.

An exemplary embodiment of the present invention provides a photographing apparatus according to an embodiment of the present invention comprises an image pickup unit comprising a plurality of vertical transmission registers for vertically transmitting charges accumulated in one vertical line, and an image pickup driving unit for supplying a drive signal to the image pickup unit. The image pickup unit comprises a first vertical transmission register to which charges that accumulated in horizontal even lines, are moved, and a second vertical transmission register to which charges that accumulated in horizontal odd lines, are moved.

The image pickup driving unit generates a first image pickup signal for moving the charges accumulated in the horizontal odd lines to the first vertical transmission register, a transmission start signal for moving the charges in the first vertical transmission register to the second vertical transmission register, and a second image pickup signal for moving the charges accumulated in the horizontal even lines to the first vertical transmission register, and supplies the first image pickup signal, the transmission start signal, and the second image pickup signal to the image pickup unit.

Here, the first photographing signal is generated after one field from generation of a still image capture signal and the transmission signal is generated after one horizontal blanking section from the generation of the first image pickup signal. Further, the second image pickup signal is generated after one horizontal blanking section from the generation of the transmission start signal.

On the other hand, according to another aspect of exemplary embodiments of the present invention, there is provided a still image photographing method comprising the steps of transmitting vertically charges accumulated in one vertical line through a plurality of vertical transmission registers, and outputting the charges in one frame of image signals according to a drive signal. The step of vertically transmitting the charges comprises the steps of moving charges accumulated in horizontal even lines to a first vertical transmission register, and moving charges accumulated in horizontal odd lines to a second vertical transmission register. Further, the step of vertically transmitting the charges further comprises the step of generating a first image pickup signal for moving the charges accumulated in the horizontal odd lines to the first vertical transmission register, a transmission start signal for moving the charges in the first vertical transmission register to the second vertical transmission register, and a second image pickup signal for moving the charges accumulated in the horizontal even lines to the first vertical transmission register.

The first photographing signal is generated after one field from generation of a still image capture signal and the transmission signal is generated after one horizontal blanking section from the generation of the first image pickup signal. Further, the second image pickup signal is generated after one horizontal blanking section from the generation of the transmission start signal.

Other objects, advantages and salient features of the invention will become apparent to those skilled in the art from the following detailed description, which, taken in conjunction with annexed drawings, disclose exemplary embodiments of the invention.

BRIEF DESCRIPTION OF THE DRAWINGS

The above aspects and features of certain exemplary embodiments of the present invention will be more apparent by the following detailed description describing certain embodiments of the present invention with reference to the accompanying drawings, in which.

DETAILED DESCRIPTION OF EXEMPLARY EMBODIMENTS

The matters exemplified in this description are provided to assist in a comprehensive understanding of exemplary embodiments of the invention. Accordingly, those of ordinary skill in the art will recognize that various changes and modifications of the embodiments described herein can be made without departing from the scope and spirit of the claimed invention. Also, descriptions of well-known functions and constructions are omitted for clarity and conciseness.

Figure 1A:
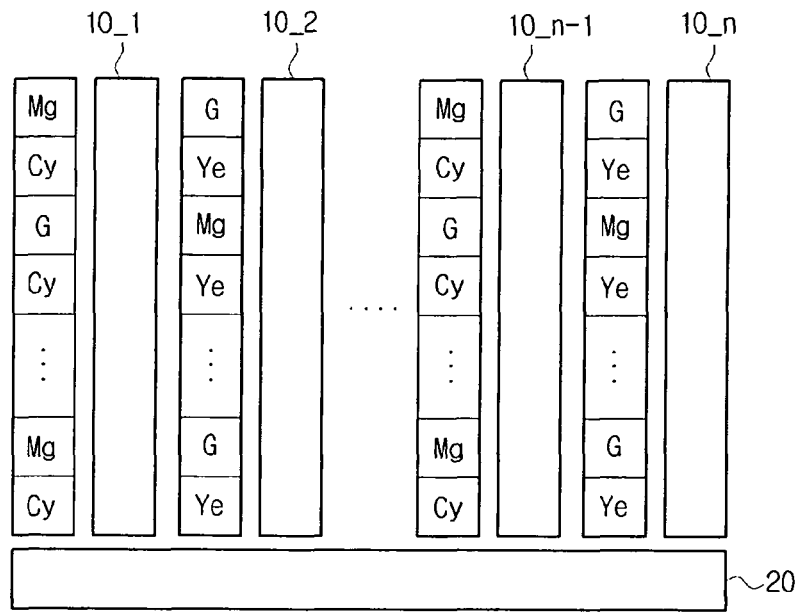
FIGS. 1A and 1B are views for explaining a conventional still image photographing method.
Figure 1B:
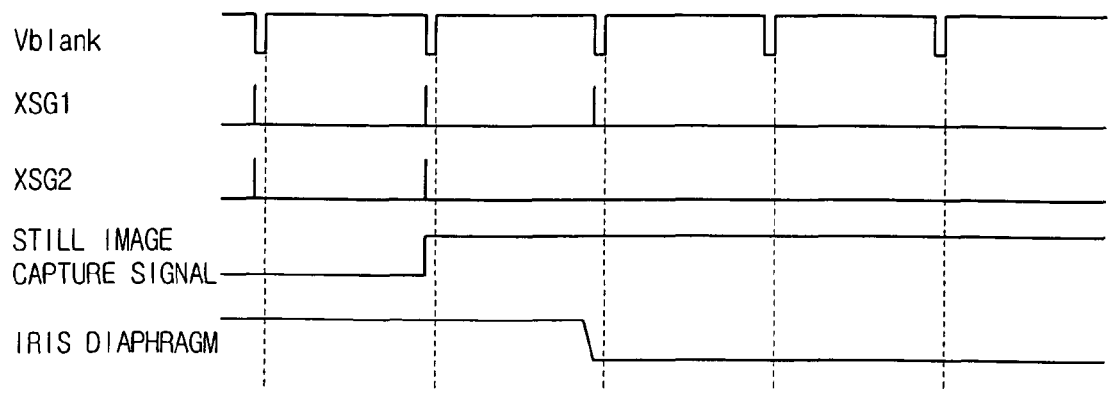
Figure 2:
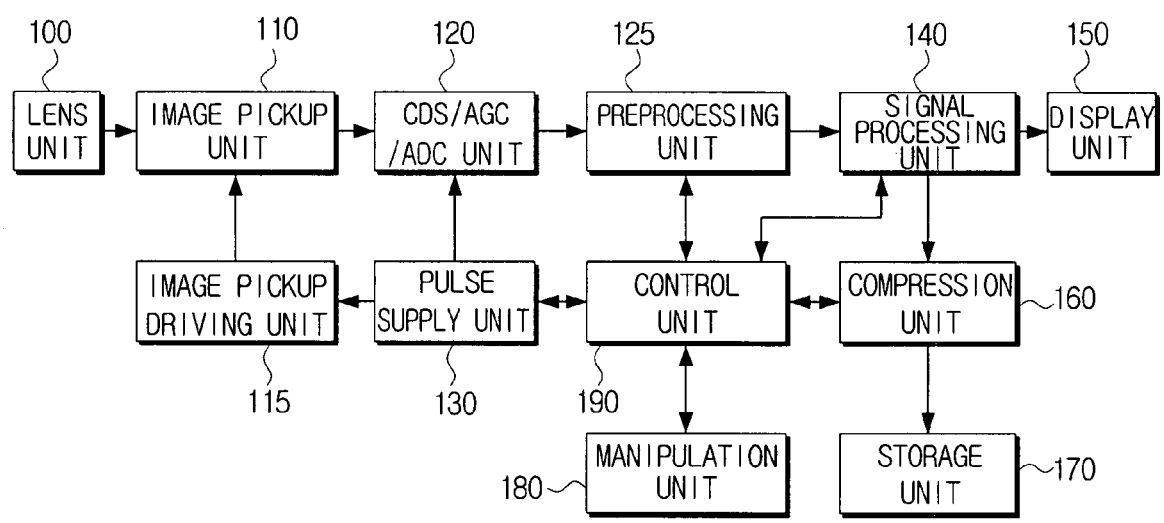
FIG. 2 is a block diagram schematically showing a photographing apparatus according to an exemplary embodiment of the present invention.

FIG. 2 is a block diagram schematically showing a photographing apparatus according to an exemplary embodiment of the present invention.

Referring to FIG. 2, the photographing according to an embodiment of the present invention includes a lens unit 100, an image pickup unit 110, an image pickup driving unit 115, a CDS/AGC/ADC unit 120, a preprocessing unit 125, a pulse supply unit 130, a signal processing unit 140, a display unit 150, a compression unit 160, a storage unit 170, a manipulation unit 180 and a control unit 190.

According to an exemplary embodiment, the light reflected by a subject to be photographed is introduced into the lens unit 100 and forms an optical image corresponding to the subject in the image pickup unit 110.

The image pickup unit 110 photo-electrically converts the optical image formed through the lens section 100 to an electrical image signal in one field unit. The image pickup unit 110 is constituted by an interlace CCD and includes two vertical transmission register and one horizontal transmission register. The operation of the image pickup unit 110 will be described in detail later with reference to FIGS. 3A and 3B.

After receiving timing and synchronizing signals supplied from the pulse supply unit 130, the image pickup driving unit 115 generates a driving voltage required for driving the image pickup driving unit 110 and an XSG1 signal and an XSG2 signal which are used to read data from the image pickup unit 110.

The CDS/AGC/ADC unit 120 removes noise from an image signal output from the image pickup unit 110 using a correlated double sampling (CDS) method and amplifies the level of the image signal using an auto gain control (AGC), and then converts the image signal to a digital image signal using an analog to digital converter (ADC).

The preprocessing unit 125 receives the digital image signal from the CDS/AGC/ADC unit 120 and separates the digital image signal into a luminance signal and a color signal. Further, although not shown in detail, the preprocessing unit 125 is used to calculate the color distribution, the charge saturation quantity, the auto focus (AF), and so on, and drive the lens unit 100.

The signal processing unit 140 displays the image signal separated into the luminance signal and the color signal on the display unit 150 such as an LCD or processes the image signal to be output on an external unit such as a monitor and a TV.

The pulse supply unit 130 supplies pulses for the operations of the image pickup driving unit 115, the CDS/AGC/ADC unit 120, the preprocessing unit 125, the signal processing unit 140, and so on.

In the case in which the image signal which has been processed in the signal processing unit 140 is one for a still image, the compression unit 160 compresses the image signal in a compression format such as JPG. Further, in the case in which the image signal is one for a motion image, the compression unit 160 compresses the image signal in a compression format such as MPEG.

The storage unit 170 stores the image signal compressed in the compression unit 160. A memory card, a compact flash (CF) card, and so on can be mounted to the storage unit 170 and an optical record medium can be used as the storage unit 170.

The manipulation unit 180 includes various keys through which user instructions are input. If a user inputs a photographing instruction through the manipulation unit 180, a corresponding still image capture signal is generated. After one field from the generation of the still image capture signal, an image of an odd field and an image of an even field are generated to output one frame of image signals from the image pickup unit 110.

Figure 3A:
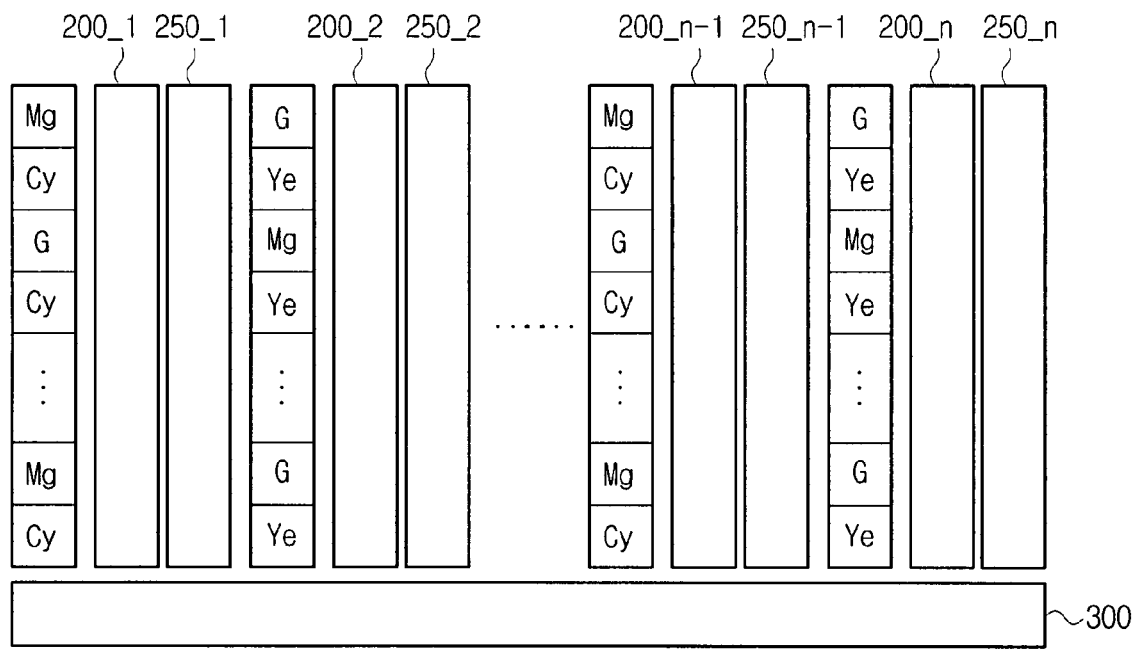
FIGS. 3A and 3B are views for explaining a still image photographing method of a photographing apparatus according to an exemplary embodiment of the present invention.
Figure 3B:
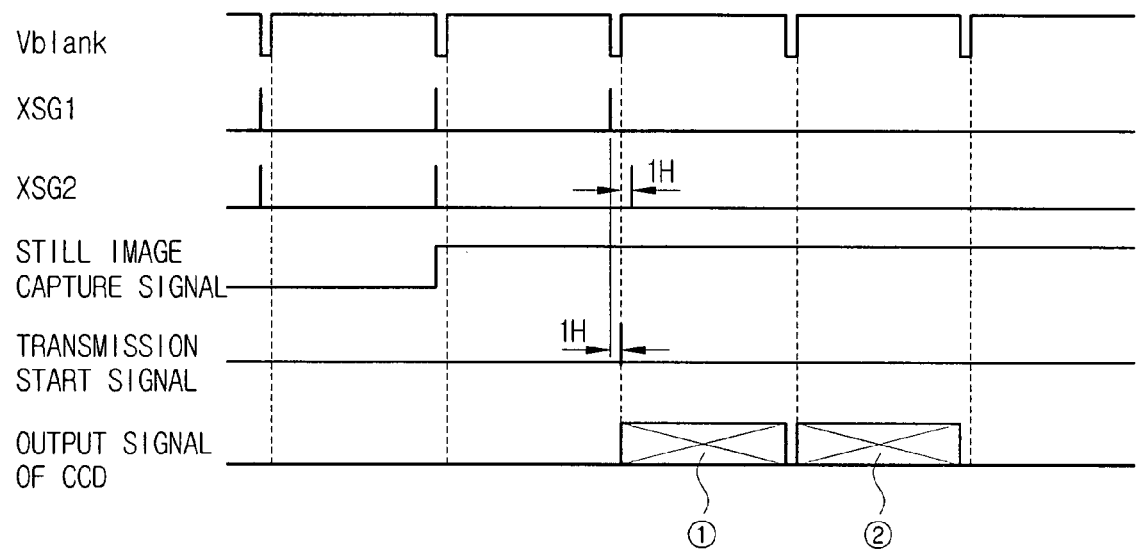

FIGS. 3A and 3B are views for explaining a still image photographing method of a photographing apparatus according to an embodiment of the present invention.

Referring to FIG. 3A, in the image pickup unit 110 of the embodiment of the present invention, a first vertical transmission register 200_1, 200_2, . . . , 200_n-1, and 200_n and a second vertical transmission register 250_1, 250_2, . . . , 250_n-1, and 250_n correspond to one vertical line Mg, Cy, G, Cy, . . . , Mg, and Cy.

A still image capture signal is generated in a high level, an XSG1 signal is generated after one field from that. If the XSG1 signal is generated, the charges accumulated in horizontal odd lines Mg, G, . . . , Mg, and G, G, Mg, . . . , G, and Mg, . . . , and Mg, G, . . . , Mg, and G are moved to the first vertical transmission registers 200_1, 200_2, . . . , 200_n-1, and 200_n.

After 1H (horizontal blanking section) from the point of time at which the XSG1 signal is generated, a transmission start signal is generated, and the charges of the first vertical transmission registers 200_1, 200_2, . . . , 200_n−1, and 200_n are moved to the second vertical transmission registers 250_1, 250_2, . . . , 250_n−1, and 250_n.

Further, after 1H, from the point of time at which the transmission start signal is generated, an XSG2 signal is generated, and the charges accumulated in horizontal even lines Cy, Ye, . . . , Cy, and Ye, Cy, Ye, . . . , Cy, and Ye, . . . , and Cy, Ye, . . . , Cy, and Ye are moved to the first vertical transmission registers 200_1, 200_2, . . . , 200_n−1, and 200_n.

According to the driving voltage supplied from the image pickup driving unit 115, the charges of the first vertical transmission registers 200_1, 200_2, . . . , 200_n−1, and 200_n are moved to a horizontal transmission register 300 for a first section ① and are output as an image signal of the odd field. Further, after one field, the charges of the second vertical transmission registers 250_1, 250_2, . . . , 250_n−1, and 250_n are moved to the horizontal transmission register 300 for a second section ② and are output as an image signal of the even field.

Figure 4:
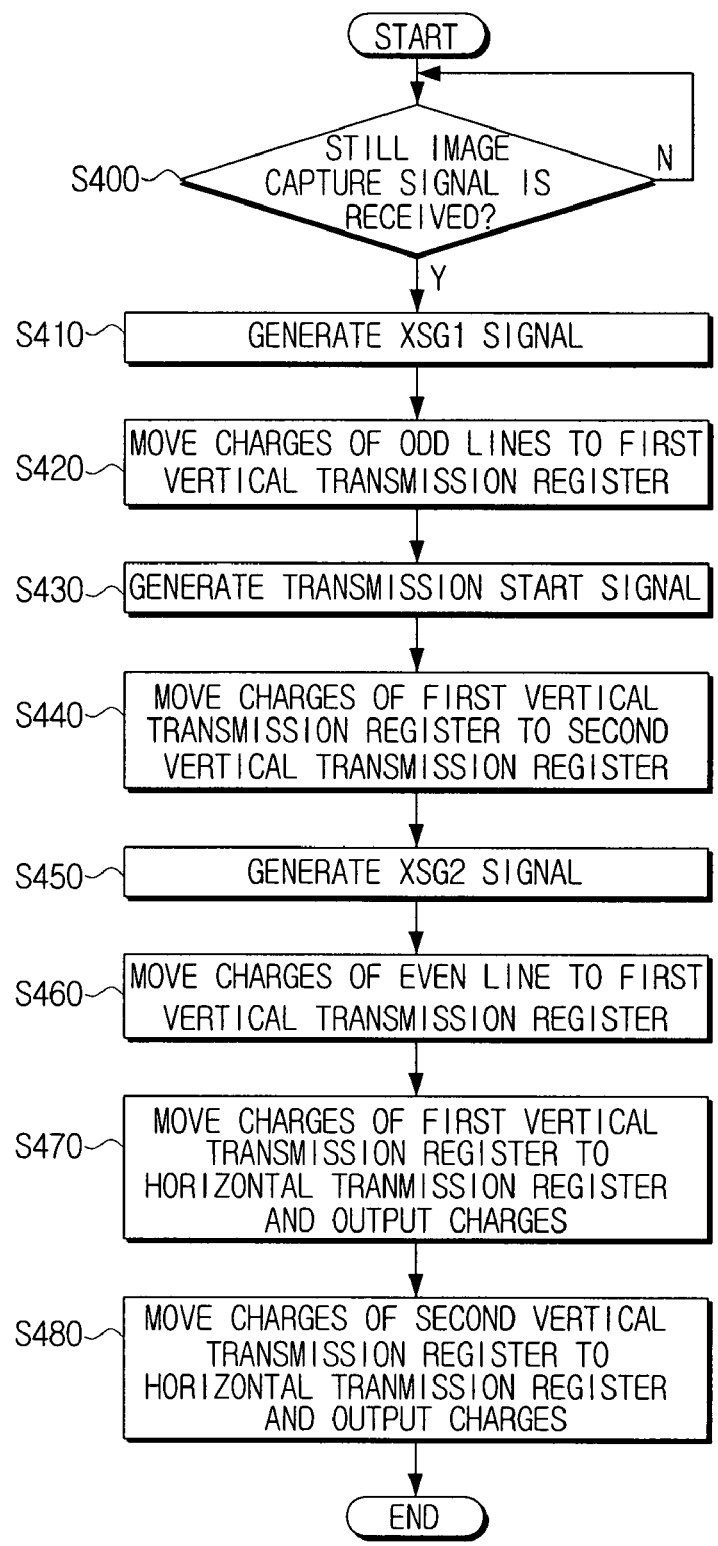
FIG. 4 is a flow chart for explaining a still image photographing operation of a photographing apparatus according to an exemplary embodiment of the present invention.

FIG. 4 is a flow chart for explaining a still image photographing operation of a photographing apparatus according to an embodiment of the present invention.

Referring to FIG. 4, first, if a still image capture signal is received (S400), after one field from that, an XSG1 signal is generated (S410). As the XSG1 signal is generated, the charges of the horizontal odd line are moved to the first vertical transmission registers 200_1, 200_2, . . . , 200_n−1, and 200_n (S420). Further, after 1H from the point of time at which the XSG1 signal is generated, a transmission start signal is generated (S430). As the transmission start signal is generated, the charges of the first vertical transmission registers 200_1, 200_2, . . . , 200_n−1, and 200_n are moved to the second vertical transmission registers 250_1, 250_2, . . . , 250_n−1, and 250_n (S440).

Further, after 1H from the point of time at which the transmission start signal is generated, an XSG2 signal is generated (S450). As the XSG2 signal is generated, the charges of the horizontal even lines are moved to the first vertical transmission registers 200_1, 200_2, . . . , 200_n−1, and 200_n (S460).

The charges of the first vertical transmission registers 200_1, 200_2, . . . , 200_n−1, and 200_n are moved to the horizontal transmission register 300 and are output (S470). Further, after one field, the charges of the second vertical transmission registers 250_1, 250_2, . . . , 250_n−1, and 250_n are moved to the horizontal transmission register 300 and are output (S480).

According to the above-mentioned processes, a still image can be photographed using two vertical transmission registers, without using an iris diaphragm.

As mentioned above, according to the present invention, since an image signal is generated by providing a first vertical transmission register in addition to a second vertical transmission register and then by storing an image of an odd field and an image of an even field in the vertical transmission registers, an iris diaphragm is not necessary and the quality of a still image can be improved.

Although embodiments of the present invention have been shown and described, it would be appreciated by those skilled in the art that the present invention is not limited to those exemplary embodiments and various modifications might be made without departing from the essence of the invention, which is claimed in the claims, and the modifications should not be understood separately from the sprit and prospect of the present invention.

What is claimed is:

1. A photographing apparatus comprising:
   an image pickup unit;
   a lens unit for forming an optical image of a subject in the image pickup unit, the image pickup unit for photoelectrically converting the optical image formed through the lens unit to an electrical image signal;
   a signal processing unit for processing the photoelectrically converted image signal to a luminance signal and a color signal;
   a compression unit for compressing the processed image signal; and
   a storage unit for storing the compressed image signal;
   wherein the image pickup unit comprises first and second vertical transmission registers for accumulating an image of an even field and an image of an odd field, respectively, the first and second vertical transmission registers being parallel to one another;
   wherein image signals of the odd field are moved to the first vertical transmission register and then to the second vertical transmission register; and
   wherein the image pickup unit further comprises a horizontal transmission register for receiving the image signals of the even field and the odd field directly from the first and second vertical transmission registers.

2. A photographing apparatus comprising:
   a plurality of light receiving portions for a vertical line;
   an image pickup unit comprising a plurality of vertical transmission registers for vertically transmitting charges accumulated in the vertical line, the vertical transmission registers being parallel to one another; and
   an image pickup driving unit for supplying a drive signal to the image pickup unit;
   wherein the image pickup unit comprises a first vertical transmission register to which charges accumulated in horizontal even lines are moved, and a second vertical transmission register to which charges accumulated in horizontal odd lines are moved;
   wherein the charges accumulated in the horizontal odd lines are moved to the first vertical transmission register and then to the second vertical transmission register; and
   wherein the image pickup unit further comprises a horizontal transmission register for receiving the charges accumulated in the horizontal even and odd lines directly from the first and second vertical transmission registers.

3. The photographing apparatus as claimed in claim 2, wherein the image pickup driving unit generates
   a first image pickup signal for moving the charges accumulated in the horizontal odd lines to the first vertical transmission register,
   a transmission start signal for moving the charges in the first vertical transmission register to the second vertical transmission register, and
   a second image pickup signal for moving the charges accumulated in the horizontal even lines to the first vertical transmission register; and
   wherein the image pickup driving unit supplies the first image pickup signal, the transmission start signal, and the second image pickup signal to the image pickup unit.

4. The photographing apparatus as claimed in claim 3, wherein the first image pickup signal is generated after one field from generation of a still image capture signal.

5. The photographing apparatus as claimed in claim 2, wherein a transmission start signal is generated after one horizontal blanking section from the generation of the first image pickup signal.

6. The photographing apparatus as claimed in claim 3, wherein the second image pickup signal is generated after one horizontal blanking section from the generation of the transmission start signal.

7. A still image photographing method, comprising:
providing an image pickup unit, first and second vertical transmission registers that are parallel to one another, a horizontal transmission register and an image pickup driving unit;
vertically transmitting charges accumulated in one vertical line through a plurality of vertical transmission registers, by moving charges accumulated in horizontal even lines to the first vertical transmission register;
moving charges accumulated in horizontal odd lines to the first vertical transmission register and then to the second vertical transmission register;
moving charges in the first and second vertical transmission registers directly to the horizontal transmission register; and
outputting the charges in one frame of image signals according to a drive signal.

8. The still image photographing method as claimed in claim 7, further comprises generating a first image pickup signal for moving the charges accumulated in the horizontal odd lines to the first vertical transmission register, a transmission start signal for moving the charges in the first vertical transmission register to the second vertical transmission register, and a second image pickup signal for moving the charges accumulated in the horizontal even lines to the first vertical transmission register.

9. The still image photographing method as claimed in claim 8, wherein the first image pickup signal is generated after one field from generation of a still image capture signal.

10. The still image photographing method as claimed in claim 8, wherein the transmission signal is generated after one horizontal blanking section from the generation of the first image pickup signal.

11. The still image photographing method as claimed in claim 8, wherein the second image pickup signal is generated after one horizontal blanking section from the generation of the transmission start signal.

* * * * *